United States Patent
Meissner et al.

(10) Patent No.: US 7,686,329 B2
(45) Date of Patent: Mar. 30, 2010

(54) AIRBAG MODULE FOR A MOTOR VEHICLE

(75) Inventors: Dirk Meissner, Berlin (DE); Axel Heym, Berlin (DE); Andreas Pradel, Berlin (DE); Thomas Lube, Berlin (DE); Gudrun Schliecker, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 1 day.

(21) Appl. No.: 12/081,190

(22) Filed: Apr. 11, 2008

(65) Prior Publication Data
US 2008/0258438 A1   Oct. 23, 2008

Related U.S. Application Data

(63) Continuation of application No. PCT/DE2006/001840, filed on Oct. 12, 2006.

(30) Foreign Application Priority Data

Oct. 17, 2005   (DE) .................. 20 2005 016 457 U

(51) Int. Cl.
*B60R 21/26* (2006.01)
*B60R 21/276* (2006.01)
(52) U.S. Cl. ............... 280/739; 280/736; 280/741; 280/742
(58) Field of Classification Search ............... 280/736, 280/738, 739, 741, 742
See application file for complete search history.

(56) References Cited

U.S. PATENT DOCUMENTS

| 3,618,980 | A | * | 11/1971 | Leising et al. ............... 280/736 |
| 3,647,393 | A | * | 3/1972 | Leising et al. ............... 280/736 |
| 3,810,655 | A | * | 5/1974 | Prachar ....................... 280/736 |
| 4,902,036 | A | * | 2/1990 | Zander et al. ................ 280/736 |
| 5,487,561 | A | * | 1/1996 | Mandzy et al. .............. 280/741 |
| 5,564,738 | A | | 10/1996 | Johnson |
| 5,639,117 | A | * | 6/1997 | Mandzy et al. .............. 280/741 |
| 5,669,631 | A | * | 9/1997 | Johnson et al. .............. 280/741 |
| 6,196,583 | B1 | * | 3/2001 | Ruckdeschel et al. ........ 280/736 |
| 6,279,948 | B1 | * | 8/2001 | Rank ........................... 280/735 |
| 2006/0267320 | A1 | | 11/2006 | Lube |

FOREIGN PATENT DOCUMENTS

| DE | 196 50 713 A1 | 6/1997 |
| DE | 196 02 695 C 2 | 7/1997 |
| DE | 103 61 887 A1 | 7/2005 |
| EP | 0 620 139 B1 | 10/1994 |
| EP | 0 620 140 A1 | 10/1994 |
| GB | 2 308 176 A | 6/1997 |

* cited by examiner

*Primary Examiner*—Paul N. Dickson
*Assistant Examiner*—George D. Spisich
(74) *Attorney, Agent, or Firm*—Foley & Lardner LLP

(57) ABSTRACT

An airbag module for a motor vehicle includes an airbag that may be inflated for restraining a person, at least one outlet opening for releasing gas out of the module and originating at least partially from the inflated airbag, and a reservoir containing coolant for cooling the gas released from the module through the outlet opening. The reservoir includes a wall that sealingly encloses the coolant and is opened to bring the coolant into direct contact with the released gas to cool the released gas.

39 Claims, 5 Drawing Sheets

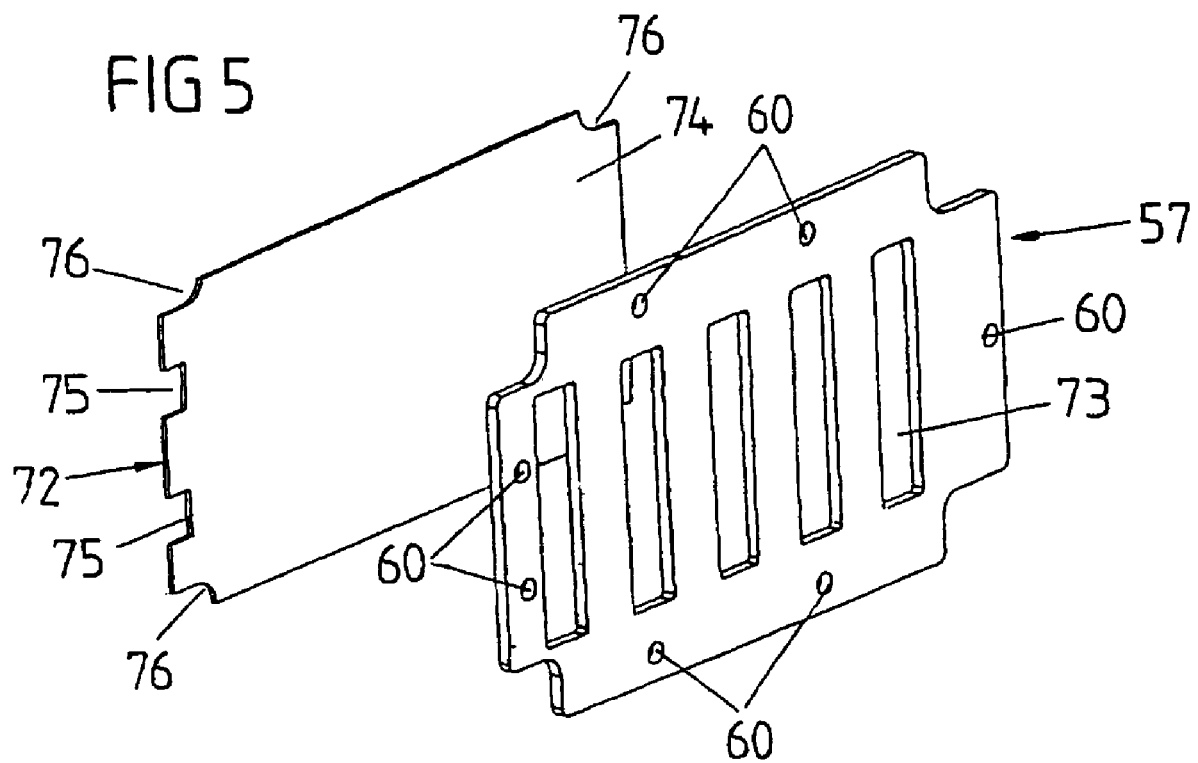
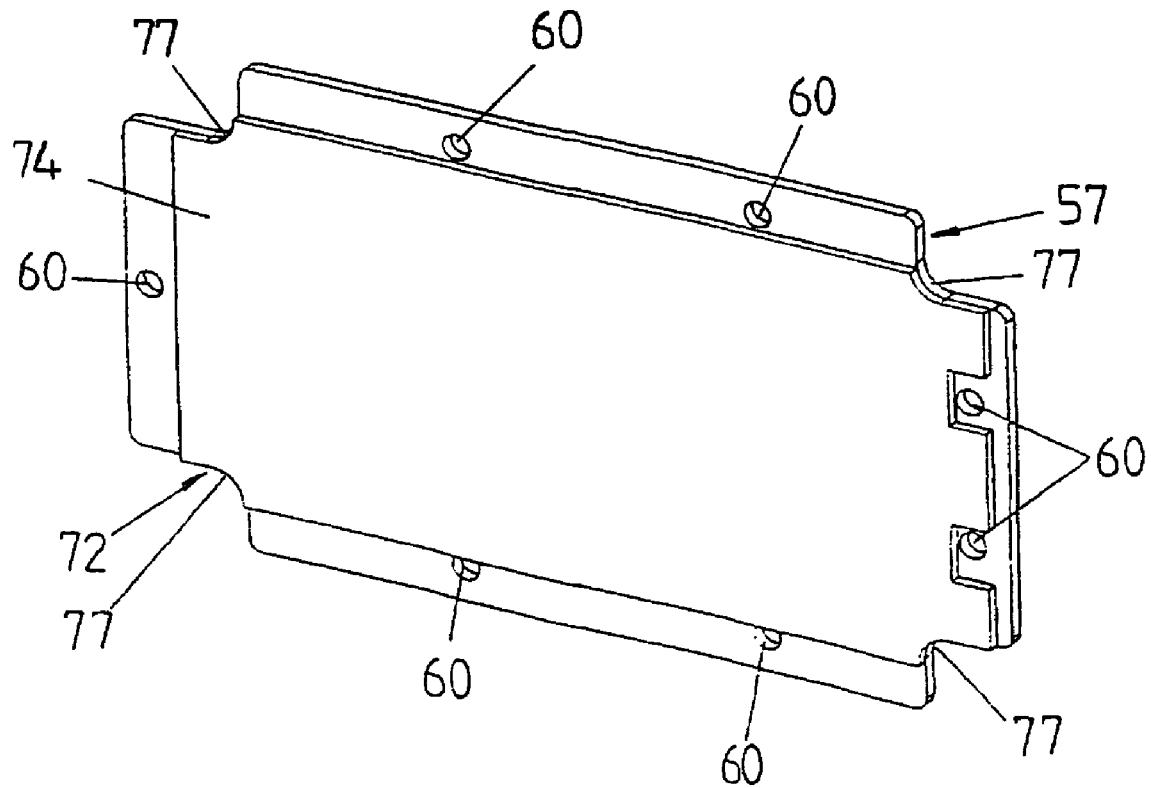

AIRBAG MODULE FOR A MOTOR VEHICLE

CROSS-REFERENCE TO RELATED PATENT APPLICATIONS

This application is a Continuation of International Application PCT/DE2006/001840, which has an international filing date of Oct. 12, 2006 and was not published in English, but was published in German as WO 2006/131112.

BACKGROUND

The present invention relates generally to an airbag module for a motor vehicle. The invention relates more specifically to an in airbag module in which outflowing gas is cooled when leaving the module.

An airbag module typically comprises an airbag that may be inflated to aid in restraining a person in a vehicle. The module typically also includes at least one outlet opening through which gas originating at least partially from the inflated airbag is able to be released out of the module. The module also may include and a reservoir with a coolant that is used for cooling the outflowing gas.

In the event of an accident, the airbag may be inflated with gas released from a gas generator and have a high temperature when a hot gas generator is used. The subsequent release of hot gas from the airbag module (in particular from the airbag) may be associated with a risk of injury for people who may come into contact with the gas. Moreover, parts of the vehicle interior fittings may be damaged by hot gas. The gas may be cooled, however the cooled gas generally conducts considerably more easily into an at least partially enclosed space (e.g., the airbag) due to the lower volume of gas required and the airbag may not completely inflate or more gas may be required to inflate the airbag.

SUMMARY

One embodiment of the invention relates to an airbag module for a motor vehicle. The air bag module includes an airbag that may be inflated for restraining a person, at least one outlet opening for releasing gas out of the module and originating at least partially from the inflated airbag, and a reservoir containing coolant for cooling the gas released from the module through the outlet opening. The reservoir includes a wall that sealingly encloses the coolant and is opened to bring the coolant into direct contact with the released gas to cool the released gas.

BRIEF DESCRIPTION OF THE DRAWINGS

The advantages and features of the invention will become clear from the following Figure descriptions of exemplary embodiments.

FIG. 5 is an exploded view of a cuboid cooling unit; and

FIG. 6 is a perspective view of a cuboid cooling unit.

DETAILED DESCRIPTION

Figure 1:
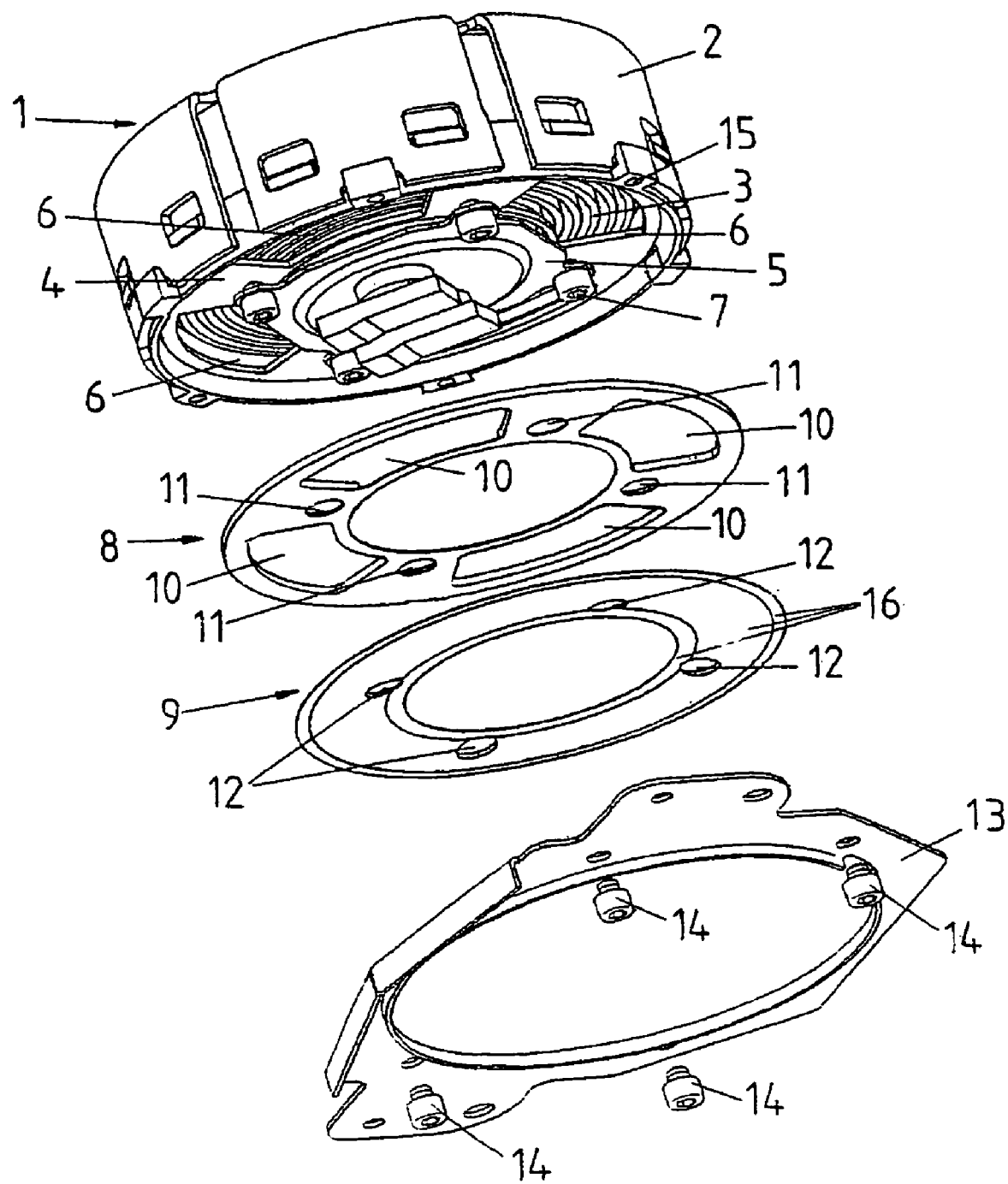
FIG. 1 is an exploded view of an annular cooling unit and a suitable pot-shaped airbag module without a cooling unit and with permanently open outlet openings.

European patent application EP 0 620 140 A1, which is herein incorporated by reference in its entirety, discloses an airbag module for conducting gas flowing out of an airbag over steel wool or aluminum wool, for example to cool the gas by heating the metal wool according to one exemplary embodiment.

German patent application DE 196 02 695 C2, which is herein incorporated by reference in its entirety, discloses a gas generator for filling an airbag with gas that may be cooled by direct contact with a liquid according to an exemplary embodiment. A cooling element formed from non-heat-resistant material is filled with a coolant and with foamed silicone rubber. When the hot gas comes into contact with the material of the cooling element, the material is damaged and the coolant released. The foamed silicone rubber may increase the available surface area of the coolant.

Other exemplary embodiments of the invention may allow rapid and effective cooling of gas when releasing the gas from an airbag module even when the gas has been previously used for inflating the airbag.

The released gas from the airbag module may flow to a reservoir which is filled with a coolant. A wall of the reservoir sealingly encloses the coolant on all sides so that a reduced amount of coolant is able to escape from the reservoir provided that the wall of the reservoir is intact and sealed. The wall may be opened in order to allow direct contact between the coolant and the gas to be cooled.

The temperature of the gas flowing out of the airbag may be rapidly reduced by the direct contact of the gas with the coolant and may be efficiently reduced by the relatively low requirement for coolant.

In a preferred exemplary embodiment of the invention, the outlet openings through which the gas is released are located in the gas generator carrier. Alternatively, said outlet openings may be located on the bottom face of the airbag module. A guide plate with a large opening that encloses the outlet openings in the airbag module in a frame-like manner may be fastened to the bottom face. The guide plate may not directly serve as a gas generator carrier but may, for example, be used in a passenger airbag module—similar to the gas generator carrier in a driver airbag module—to guide specific elements of the airbag module (e.g., a valve slide) and to receive openings for releasing gas. The guide plate may also be a device for fastening a pyrotechnic element or thread for fastening further elements to the guide plate. The guide plate is typically attached to the housing of the airbag module.

According to a preferred exemplary embodiment, the coolant reservoir is located in the flow path of the released gas and thus upstream of the outlet openings of the airbag module. Alternatively, the coolant reservoir may be arranged in the flow path of the released gas downstream of the outlet openings of the airbag module.

According to another preferred embodiment, the wall of the coolant reservoir encloses a hollow space or a plurality of hollow spaces, in which the coolant is located. The wall of the coolant reservoir is preferably made from a plastic material.

In another preferred embodiment, the coolant reservoir has a planar basic shape, for example that of a disk-shaped ring or cuboid. The term "planar" is intended to be understood in this case that the expansions of the reservoir are greater in length and width than the expansion in height, while the length and width of the reservoir extend substantially in one plane.

Various exemplary embodiments may include a solid or a liquid coolant. By using various coolants (e.g., water), the cooling of gases may be possible at a wide range of temperatures. As the reservoir only has to be filled with coolant, a more simple and less complicated reservoir may be used.

In a preferred embodiment, the coolant has a sublimation point, evaporation point, or other phase transition point in a temperature range of the gas to be cooled. As a result, direct or indirect contact of the gas to be cooled with the reservoir filled with coolant leads to a higher absorption of energy by the coolant in the course of its phase transition. The high evaporation point, sublimation point or other phase transition enthalpy of the coolant, which is applied to the detriment of the temperature of the gas, leads to an effective cooling of the gas. In comparison with a coolant that has no phase transition in the corresponding temperature range, by utilizing the phase transition enthalpy of the coolant considerably less coolant may be used to achieve a comparable cooling of the airbag gas and increase the efficiency of the cooling process.

The phase transition of the coolant is preferably a transition into the gaseous phase to achieve a volume increase of the coolant that is as large as possible. The alteration to the volume accompanying the phase transition of the coolant may lead to a high increase in pressure inside the reservoir. Preferably, this leads solely, or in combination with the pressure exerted by the outflowing gas on the reservoir and/or with the thermal loading of the reservoir by the hot gas, to an opening of the wall of the reservoir. As a result, coolant is released both in its original state and also in its new state. The direct contact of the gas to be cooled with the released coolant leads to an even more effective energy transmission from the gas to the coolant than was possible by indirect contact as the contact surface area is significantly increased between the gas and the coolant.

According to various exemplary embodiments, the reservoir may not be primarily opened by the internal pressure produced by the evaporating coolant or sublimating coolant, but may be opened by the pressure exerted by the outflowing gas on the reservoir and allow a direct contact between the gas and coolant.

According to other exemplary embodiments, a pyrotechnic unit (which may be separate and associated specifically with the coolant reservoir) is located sealingly on the coolant reservoir. After activation of the pyrotechnic unit by the applied pressure (possibly indirectly via a force transmission element activated by the pyrotechnic unit), an opening is formed in the wall of the coolant reservoir.

Preferably, the wall of the reservoir reacts to overpressure and acts on the wall either from the inside, the outside, in combination with thermal loading by rupturing or splitting open, and/or by a comparable process that damages the wall of the reservoir. The wall may have at least one predetermined rupture point that leads to easier rupture of the wall at that point. The predetermined rupture point may be, for example, a perforation, a score line, and/or a comparable weakened portion.

According to various exemplary embodiments, the outlet openings of the module may be permanently open to allow a continuous outflow of gas from the airbag and/or the module. According to the pressure conditions of the airbag and surroundings and even during the filling of the airbag, one portion of the airbag gas may flow out of the airbag and/or the module and come into contact with the coolant reservoir.

According to other exemplary embodiments, the outflow of gas from the module may be controlled by at least one controllable valve. The control may be carried out by a closure element, for example by a valve slide, as disclosed in DE 103 61 887 A1, which is herein incorporated by reference in its entirety. An annular adjusting disk may be displaced as the closure element in a limited rotational movement by the pressure applied by a pyrotechnic element. In an initial position the outlet openings of the adjusting disk, which may be similar in shape and number to those of the valve main body located above the adjusting disk, are not aligned with said outlet openings of the valve main body and the closure element is closed. By the limited rotational movement, the adjusting disk is moved into a position where the outlet openings are aligned with those of the valve main body and the closure element is open. Such an arrangement may be used when the airbag module is intended to be accommodated in a steering wheel or is intended to have a cylindrical shape. Such a control of the gas flow may, however, also be used when the airbag module is intended to have a generally prismatic or cuboid shape, for example to be used on the passenger side of a vehicle. In this case, an equivalent valve slide carries out a comparable limited translatory movement relative to a guide plate. The energy required for this movement may be provided by a pyrotechnic element in a manner similar to the rotational movement.

According to other exemplary embodiments, the closure element may include projections on the side facing the coolant reservoir. In the defined rotational or translatory movement of the closure element for opening the outflow openings of the airbag module, the projections may come into contact with the wall of the coolant reservoir. This contact may either create a predetermined rupture point in the wall (e.g., in the form of a score or a perforation) or directly tear open the coolant reservoir by damaging the wall. The gas flowing out of the airbag may come even more rapidly into direct contact with the coolant and the time period that the gas requires for flowing out of the airbag module may be shortened.

Alternatively, by the overpressure from inside or outside the wall of the reservoir, an opening device, for example a valve or a flap, is reversibly opened and releases the coolant so that it leads to direct contact between the coolant and the gas. The wall of the coolant reservoir may not be damaged when opening the reservoir but is still intact after closing the opening device.

Preferably, the gas flowing out of the module may flow into a partially or entirely enclosed container. Due to the low temperature of the gas, the gas may have a relatively smaller volume than a gas that has not been cooled. The use of a partially or entirely enclosed container may additionally reduce the risk of injury. Damage to the vehicle interior fittings may also be reduced or eliminated by the lower gas temperature and the use of the container.

In a preferred embodiment, the coolant reservoir is provided with a carrier (for example in the form of a carrier plate) and is attached by fastening elements (e.g., screws) to an airbag device so that the carrier and reservoir are fixedly connected to one another and fixedly connected to a suitable receiving part in the airbag module. The carrier and reservoir may, for example, be fixed between the gas generator carrier and the flange of the gas generator. Both the carrier and the coolant reservoir have circular recesses that are aligned with one another and are generally congruent with the threads in the gas generator carrier into which the screws are fastened. Alternatively or additionally to screwing, the carrier and coolant reservoir may be fastened to the airbag module by clamping, bonding, welding, or similar methods for fastening. The carrier and coolant reservoir may also be connected to one another by clamping, bonding, welding or similar methods for fastening. The carrier may stabilize the coolant reservoir and allow for a larger range of materials from which the coolant reservoir may be made. The carrier itself is preferably produced from a plastic material. The carrier and the coolant reservoir may form a cooling unit as a result of their connection.

The carrier and the coolant reservoir may respectively have a shape such that they may be fitted into differently shaped airbag modules. The carrier and reservoir, for example, may have an annular basic shape to be integrated into an airbag module designed for use in a steering wheel or a similarly shaped housing. The coolant reservoir may, for example, also have the shape of an open ring while the carrier has a general shape of a closed ring with a recess in the region of the opening of the coolant reservoir. These interruptions to the fully closed rings may allow the carrier and coolant reservoir to be incorporated into airbag modules equipped with a pyrotechnic unit for generating pressure for the movement of a valve slide. The carrier plate and coolant reservoir may have a prismatic or cuboid shape and may be incorporated into an airbag module designed for use in a passenger seat in a motor vehicle or for use in any other prismatic or cuboid housing.

When the carrier is arranged between the outlet openings of the gas generator carrier or the valve main body and the coolant reservoir, the released gas from the module flows through the outlet openings of the generator carrier or the valve main body and then through the apertures of the carrier to come into contact with the coolant reservoir. When using a passenger airbag module in which the outlet openings of the module are not in the gas generator carrier but on the bottom face of the airbag module, the same position of the carrier plate and coolant reservoir may result in the released gas from the module flowing out of the airbag and coming into contact with the coolant reservoir first and then flowing through the apertures of the carrier plate and the outlet openings of the airbag module.

Preferably, the carrier has at least one aperture so that the airbag gases are able to escape from the airbag module. The shape and number of apertures are generally similar to the apertures of the outlet openings of the airbag module (e.g., the apertures of the gas generator carrier and/or the valve main body, the apertures of the outlet openings incorporated in the bottom face of the airbag module, etc.). Preferably, the aperture and/or apertures of the carrier are congruent with the outlet opening and/or the outlet openings of the airbag module so that the gas outflow from the module is not hindered by the carrier.

When using a generally cylindrical airbag module, an adapter plate may be fastened to the module by suitable fastening elements, for example screws. The adapter plate may stabilize the coolant reservoir and carrier plate on the respective radial outer faces thereof by clamping. Thus the adapter plate may be an optional component of the cooling unit. The adapter plate may provide and/or allow the incorporation of the airbag module into a steering wheel or a further receiver space in a motor vehicle.

FIG. 1 shows a cylindrical airbag module 1 (e.g., a driver and/or pot-shaped airbag module) comprising a module cover 2, an inflatable airbag 3, a gas generator carrier 4 and a gas generator flange 5. A gas generator (e.g., a hot gas generator) provides the gas for filling the airbag by a chemical process, is located in the interior of the module 1, and is fixedly connected via the gas generator flange 5 to the gas generator carrier 4 by fastening screws 7. The module 1 has four generally permanently open outlet openings 6 incorporated in the gas generator carrier 4. Gas that has previously been located in the airbag 3 may continuously flow out of the module 1 through the outlet openings 6. A planar annular carrier plate 8 includes four generally evenly distributed apertures 10 and circular openings 11. A planar annular coolant reservoir 9 includes a wall 16 enclosing a hollow space and four circular openings 12. The carrier plate 8 and reservoir 9 are fastened between the gas generator flange 5 and the gas generator carrier 4 by the screws 7 so that the carrier plate 8 is located on the side of the gas generator carrier 4 and the coolant reservoir 9 is on the side of the gas generator flange 5. The circular openings 11 in the carrier plate 8 may also allow for screws 7 to passing through and screw into threads in the gas generator carrier 4. The four apertures 10 of the carrier plate 8 are aligned with the outlet openings 6 of the gas generator carrier 4, so that the gas flowing out of the module 1 may come into contact with the coolant reservoir 9 unhindered. An adapter plate 13 includes a large circular opening and a radius that is smaller than the external radius of the carrier plate 8 and the coolant reservoir 9 so that after fastening with the screws 14 in corresponding threads 15 an effective clamping in the radial outer region of the carrier plate 8 and coolant reservoir 9 is produced. The entire airbag module 1 with the integral carrier plate 8 and integral coolant reservoir 9 may be fastened in a steering wheel configured to receive an airbag module.

Figure 2:
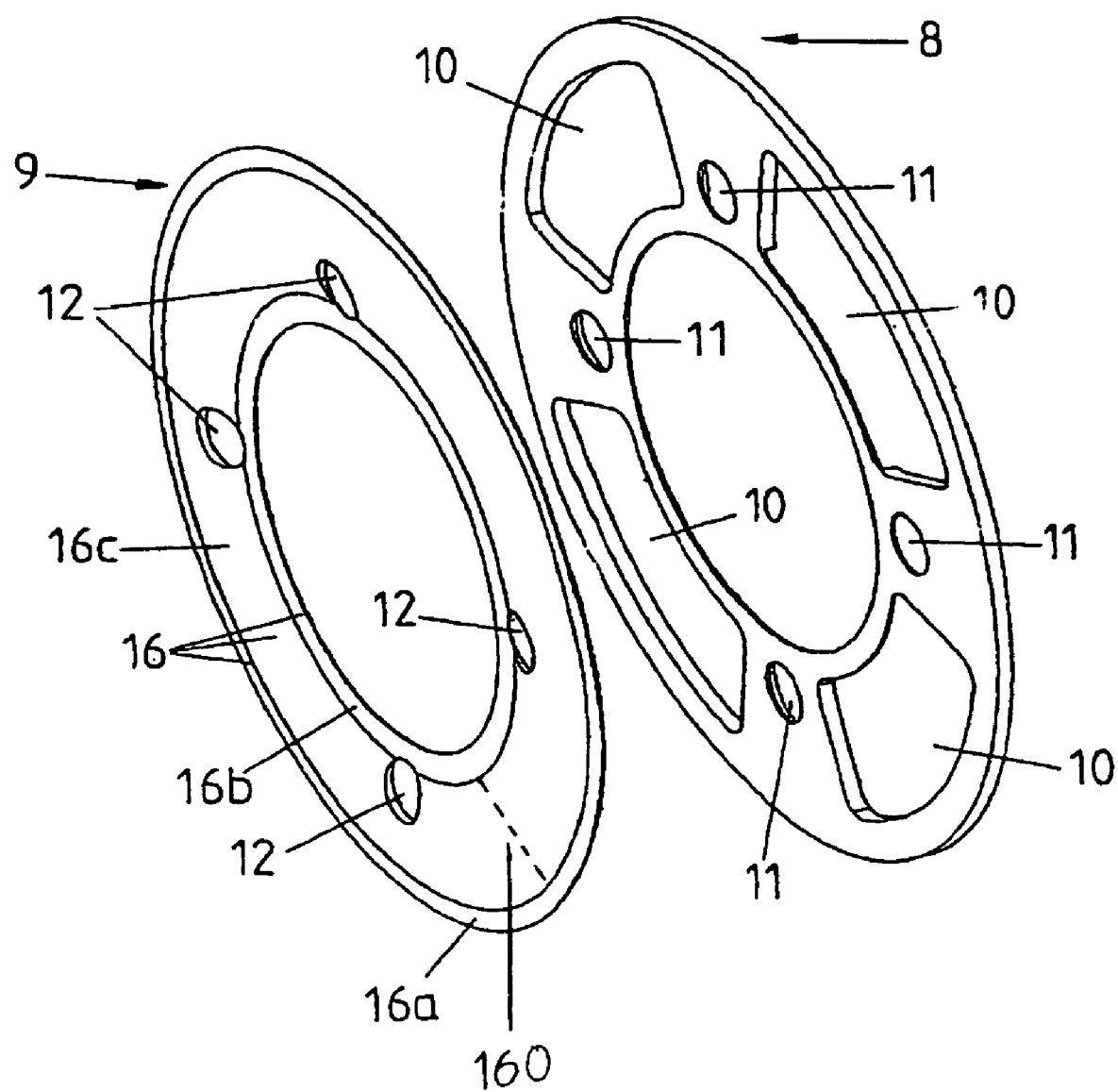
FIG. 2 is a perspective view of an annular coolant reservoir and a carrier plate.

According to one exemplary embodiment, the mode of operation of the cooling of the hot gas when flowing out of the airbag is to be described briefly hereinafter with reference to FIG. 1. The gas escaping through the outlet openings 6 and the apertures 10 comes into contact with the coolant reservoir 9, which includes a wall 16 enclosing a hollow space and is filled in its interior with coolant (e.g., water). The hot gas heats the coolant and changes the coolant into the gaseous state increasing the pressure in the interior of the coolant reservoir 9. The coolant reservoir 9 is configured so its wall 16 ruptures as a result of the increased pressure and releases the coolant to direct contact between the gas and coolant. For example, the rupture of the coolant reservoir 9 may occur at a single point or, as shown in FIG. 2, the rupture point may be configured as a score line or perforation 160. The effectiveness of the cooling process may be significantly increased by direct contact between the gas and coolant.

FIG. 2 shows an enlarged view of the planar annular carrier plate 8 and the planar annular coolant reservoir 9 of FIG. 1. In the outer annular region 16a and in the internal annular region 16b of the wall 16 of the coolant reservoir 9, two plastics layers of the wall 16 are directly superimposed without forming a hollow space. A hollow space may be formed in the central annular region 16c of the wall 16 and filled with coolant. The circular openings 11 in the carrier plate 8 may be apertures for fastening screws. The four outlet openings 10 in the carrier plate 8 allow a flow of gas from the airbag module to the coolant reservoir 9. The openings 10 may be configured in the same manner as the outlet openings 6 of the gas generator carrier 4 of FIG. 1 and are aligned after mounting the carrier plate 8 and coolant reservoir 9 (see FIG. 1). As a result, the carrier plate 8 may exert no additional resistance to the gas flow from the airbag 3 in the module 1.

Figure 3:
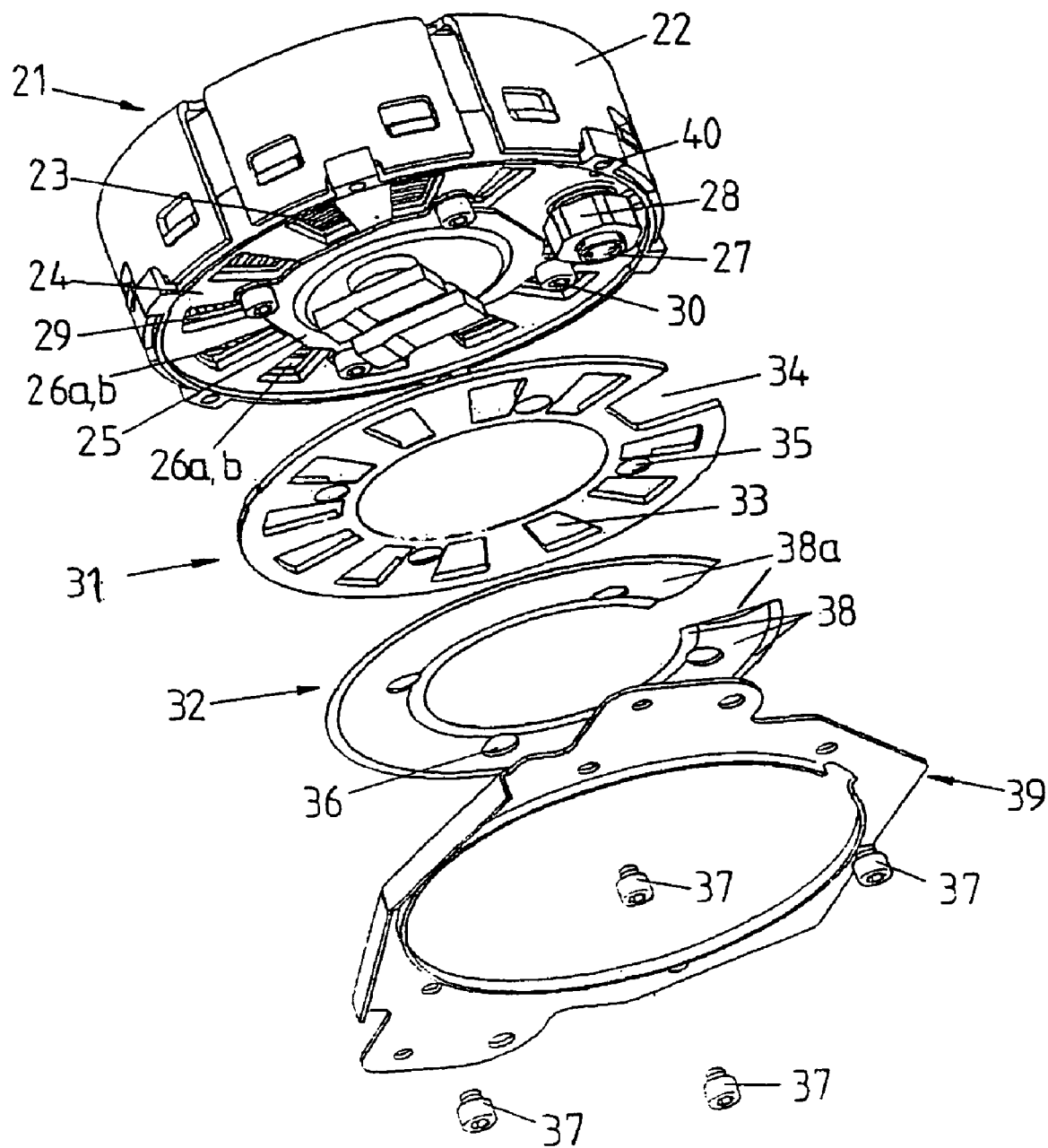
FIG. 3 is an exploded view of a cooling unit in the form of an open ring and a suitable pot-shaped airbag module without a cooling unit with outlet openings where the openings may be controlled by controllable valves.

FIG. 3 shows a cylindrical airbag module 21 (e.g., a driver and/or pot-shaped airbag module) with a module cover 22, an inflatable airbag 23, a valve main body 24 and a gas generator flange 25. A gas generator is located inside the module 21 and is connected to the main valve body 24 by the gas generator flange 25 and fastening screws 30. The valve main body 24 may be a gas generator carrier or represents a special type of gas generator carrier. The valve main body 24 has a plurality of closable outlet openings 26a that when opened allow gas from the airbag 23 is to flow out of the module 21. It is noted that in FIG. 2, only two of the outlet openings 26a have been identified and are representative of each outlet opening. The initially closed outlet openings 26a may be opened by a pyrotechnic element 27 fastened by a union nut 28 to a projection of the valve main body 24. An external signal may activate the pyrotechnic element 27 to move in a limited rotational manner by a pressure increase in a pressure chamber of the valve main body 24. A planar annular adjusting disk 29 is located between the valve main body 24 and the airbag 23 and has the same number and shape of outlet openings 26b as the outlet openings 26a of the valve main body 24. It is noted that only two of the outlet openings 26b have been identified and are representative of each outlet openings. By the limited rotational movement of the adjusting disk 29, the outlet openings 26b are moved into a position where they are aligned with the outlet openings 26a of the valve main body 24 (as shown in FIG. 3) and provide an opening through the outlet openings 26a.

A planar carrier plate 31 has the basic shape of a closed ring but has a recess 34 projecting from the outer edge of the plate towards the inside and encompasses less than the complete width of the carrier plate 31 so that the annular basic shape of the carrier plate 31 is not entirely interrupted. The carrier plate 31 and a planar coolant reservoir 32 (with the basic shape of an open ring) are fastened between the gas generator flange 25 and the valve main body 24 by screws 30 such that the carrier plate 31 is located on the side of the valve main body 24 and the coolant reservoir 32 is on the side of the gas generator flange 25. The annular opening of the coolant reservoir 32 is positioned over the recess 34 of the carrier plate 31 so the pyrotechnic element 27 is in contact neither with the carrier plate 31 nor with the coolant reservoir 32. The carrier plate 31 generally has the same number, shape, and arrangement of apertures 33 as the valve main body has outlet openings 26a and the adjusting disk 29 has outlet openings 26b. In FIG. 3 and by way of example, an aperture 33 is identified as being representative of the other apertures. The carrier plate 31 is fastened to the valve main body 24 so the apertures 33 are aligned with the outlet openings 26a. As a result, the gas flowing out of the module is able to come into contact with the coolant reservoir 32 generally unhindered, provided that the outlet openings 26a are congruent or at least similar to the outlet openings 26b and not closed by the adjusting disk 29. The carrier plate 31 defines circular openings 35, which are apertures for the fastening screws 30 and coolant reservoir 32 defines circular openings 36. Only one of each of the circular openings 35, 36 is identified as being representative of the other openings shaped in a similar manner.

The coolant reservoir 32 has a wall 38 enclosing a hollow space. As in the exemplary embodiments described with reference to FIG. 2, the hollow space is located in the central region 38a of the open ring and is filled with a coolant. The coolant reservoir 32 differs from the coolant reservoir 9 of FIGS. 1 and 2 only in that it does not have the shape of a closed ring but that of an open ring.

An adapter plate 39 defines a large circular opening with a radius smaller than the external radius of the carrier plate 31 and the coolant reservoir 32. When the adapter plate 39 is fastened with screws 37 in corresponding threads 40 in the module 21, it produces an effective clamping in the radial outer region of the carrier plate 31 and the coolant reservoir 32. The entire airbag module 21 together with integral carrier plate 31 and integral coolant reservoir 32 may be fastened in a steering wheel designed for receiving an airbag module.

The general cooling mechanism of the arrangement shown in FIG. 3, generally does not differ from the mechanism of the arrangement shown in FIG. 1. The difference between the two arrangements is that the flow of gas out of the module 1 in FIG. 1 is carried out continuously while the gas may be released by the adjusting disk 29 (depending on various parameters) with the module 21 in FIG. 3.

Figure 4:
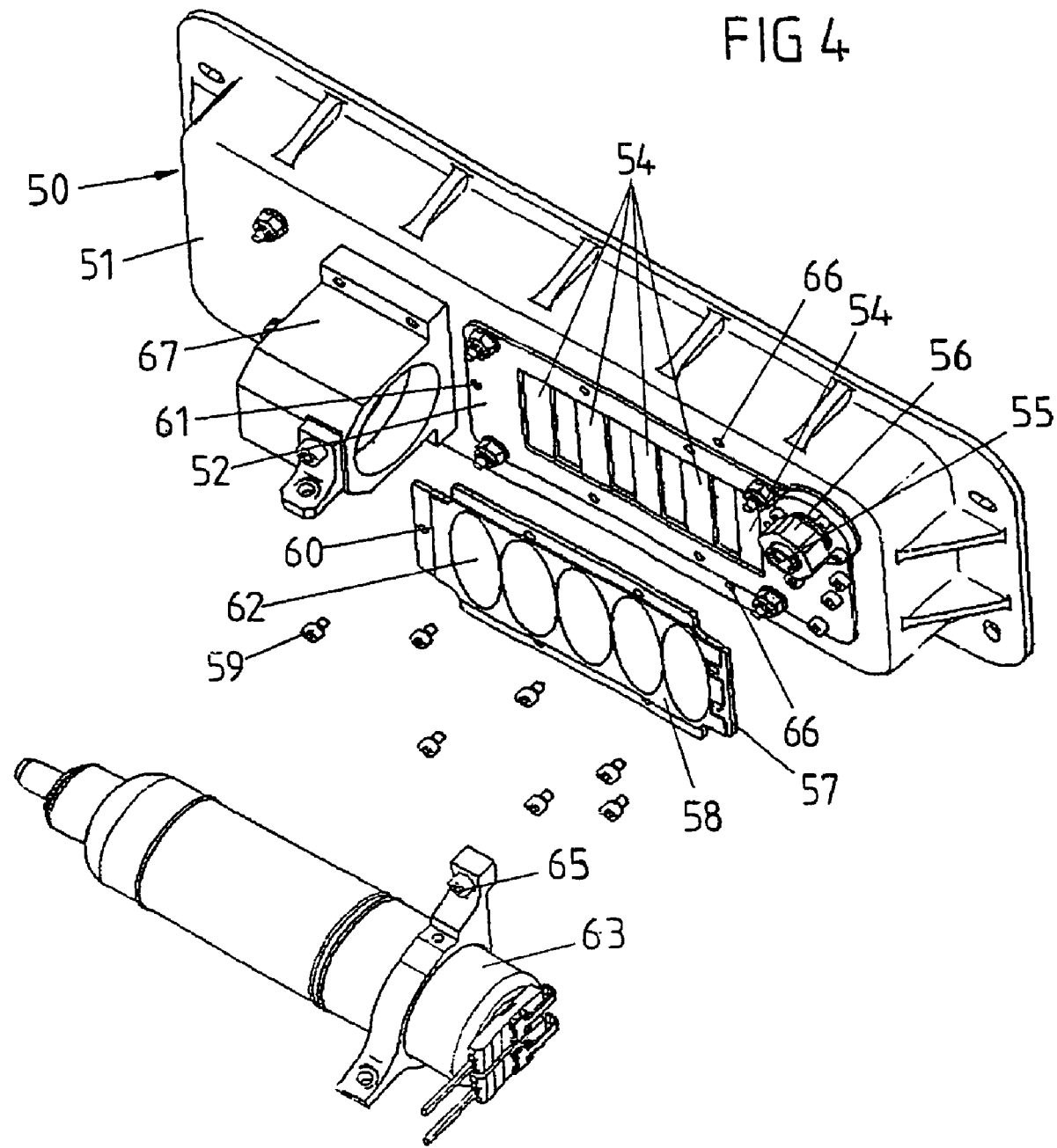
FIG. 4 is a partial exploded view of a cuboid cooling unit and a suitable airbag module without the cooling unit with outlet openings where the opening may be controlled by controllable valves.

FIG. 4 shows a generally prismatic or cuboid airbag module 50 (e.g., a passenger airbag module) that comprises a module housing 51 on a bottom face with a plurality of outlet openings and a frame-like guide plate 52 surrounding the outlet openings that defines a large central opening and a plurality of threads 61. It is noted that only one thread 61 is identified and is representative of each thread. The outlet openings in the bottom face of the module housing 51 are not visible in FIG. 4, but are covered by projections 54 of a movable valve slide that is attached between the outlet openings and the guide plate 52. If the projections 54 of the valve slide (as shown in FIG. 4) are located over the outlet openings in the bottom face of the module housing 51, the outlet openings are closed. The outlet openings may be opened by a pyrotechnic element 55 which is fastened by a union nut 56 to a projection of the guide plate 52. The pyrotechnic element 55 is activated by an external signal and may move the valve slide in a limited translatory manner by a pressure increase in a pressure chamber. As a result, the projections 54 of the valve slide move into a position where they no longer cover the outlet openings and thus the outlet openings are opened. A carrier plate 57 has a cuboid basic shape with inwardly rounded corners as well as circular recesses 60 and is described in detail with reference to FIG. 5. A coolant reservoir 58 includes a wall that encloses a plurality of hollow spaces 62 filled with coolant. The carrier plate 57 and the reservoir 58 are fixedly connected to one another, for example bonded or welded. The coolant reservoir 58 and the carrier plate 57 are fixedly connected to the guide plate 52 by screws 59 and recesses 60 (a penetration point for the screws 59) via threads 61 in the guide plate 52. Only individual examples of screws 59, circular recesses 60 in the carrier plate 57, threads 61 in the guide plate 52, and hollow spaces 62 in the coolant reservoir 58 are identified in the Figure and are example representatives of each component. A gas generator 63 generates gas by to fill an airbag (not shown) and is attached in front of the coolant reservoir 58 and the carrier plate 59 and fastened by screws 65 in threads 66 to the module housing 51. The gas generator is fixed by a support unit 67 of annular design that is attached to the module housing 51. The support unit 67 also introduces the gases escaping from the gas generator into the airbag.

In an exemplary embodiment according to FIG. 4, gas that is intended to flow out of the module housing 51 and the airbag comes into contact with the coolant reservoir 58 and heats the coolant located in the hollow spaces 62. The heating changes the coolant into the gaseous phase and causes the wall of the coolant reservoir 58 to burst. A hollow space 62 of the reservoir 58 filled with coolant is associated with each outlet opening in the bottom face of the module housing 51. The direct contact between the gas and coolant may lead to efficient cooling of the gas flowing out of the airbag and airbag module through the opened outlet openings in the bottom face of the module housing 51.

FIG. 5 and FIG. 6 show an exploded view (FIG. 5) and a perspective view (FIG. 6) of a generally prismatic or cuboid cooling unit that may be used in a passenger airbag module such as illustrated in FIG. 4. The cooling unit includes a cuboid coolant reservoir 72 that comprises a wall 74 enclosing a hollow space. The cooling unit also includes a cuboid carrier plate 57 that serves to stabilize and fasten the coolant reservoir 72 to the guide plate 52 shown in FIG. 4. The coolant reservoir 72 defines two recesses 75 on one of its narrow sides and that are located in the region of two openings 60 for fastening the carrier plate 57 to the guide plate 52 of FIG. 4.

The coolant reservoir 72 and the carrier plate 57 have inwardly rounded corners 76 and/or 77 that are aligned with one another when the coolant reservoir 72 and the carrier plate 57 are connected fixedly to one another. The wall 74 of the reservoir 72 encloses a continuous hollow space that is filled in the interior with a coolant (e.g., water) that evaporates in the temperature range of the airbag gases. The volume increase of the coolant caused by the evaporation leads to an increasing pressure in the reservoir 72 and that may cause the wall 74 of the reservoir 72 to burst, leading to a direct contact between the airbag gases and the coolant located in the coolant reservoir 72. In contrast to the coolant reservoir 58 shown in FIG. 4, the coolant reservoir 72 shown in FIGS. 5 and 6 does not have individual chambers and/or hollow spaces separated from one another but has a single continuous hollow space that is filled with the coolant. Both a coolant reservoir 58 with hollow spaces 62 separated from one another (see FIG. 4) and a reservoir 72 with a continuous hollow space may be used in the airbag module illustrated in FIG. 4.

The carrier plate 57 has a plurality of outlet openings 73, of which one is identified in FIG. 5 as being representative of each outlet opening. The outlet openings 73 are identical or at least similar in number and shape to the outlet openings in the bottom face of the module housing 51 in FIG. 4. The outlet openings 73 are aligned (after assembling the carrier plate 57 on the guide plate 52) by using the circular openings 60, which receive screws 59 (see FIG. 4). When used in an airbag module, the carrier plate 57 and the coolant reservoir 72 are fixedly connected to one another (for example by bonding or welding) as shown in FIG. 6. Thus it may not be necessary to provide the coolant reservoir 72 with circular openings for passing through screws or other fastening elements.

The priority application, German patent application no. 202005016457.7, filed Oct. 17, 2005 including the specification, drawings, claims and abstract, is incorporated herein by reference in its entirety.

Given the disclosure of the invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a motor vehicle, comprising:
   an airbag that may be inflated for restraining a person;
   at least one outlet opening for releasing gas out of the module which was originally provided by a gas generator for inflating the airbag and which was at least partially contained in the inflated airbag prior to its release through the at least one opening; and
   a reservoir containing coolant for cooling the gas released from the module through the outlet opening;
   wherein the reservoir comprises a wall that sealingly encloses the coolant and is opened to bring the coolant into direct contact with the released gas to cool the released gas.

2. The airbag module as claimed in claim 1, comprising a gas generator carrier that includes the at least one outlet opening.

3. The airbag module as claimed in claim 1, comprising a module housing with a bottom face that includes the at least one outlet opening.

4. The airbag module as claimed in claim 1, wherein the coolant reservoir is located in the flow path of the released gas downstream of the outlet opening of the airbag module.

5. The airbag module as claimed in claim 1, wherein the reservoir is configured such that the wall encloses at least one space for receiving the coolant.

6. The airbag module as claimed in claim 5, wherein the wall of the reservoir is made from a plastic material.

7. The airbag module as claimed in claim 5, wherein the reservoir extends substantially in one plane and has a greater extension parallel to said plane than perpendicular to said plane.

8. The airbag module as claimed in claim 1, wherein the coolant is a solid or a liquid.

9. The airbag module as claimed in claim 8, wherein the coolant is water.

10. The airbag module as claimed claim 1, wherein the coolant has a phase transition when in direct or indirect contact with the gas to be cooled.

11. The airbag module as claimed in claim 10, wherein the phase transition of the coolant is a transition into a gaseous phase.

12. The airbag module as claimed in claim 10, wherein the wall of the reservoir is configured to open by an overpressure of the coolant as a result of the phase transition.

13. The airbag module as claimed in claim 1, wherein the reservoir defines a space receiving the released gas.

14. The airbag module as claimed in claim 13, wherein the wall of the reservoir is configured to open by the pressure of the released gas.

15. The airbag module as claimed in claim 1, wherein the wall of the reservoir is subject to thermal loading by the released gas.

16. The airbag module as claimed in claim 1, wherein the wall of the reservoir is configured to open by overpressure of the coolant, pressure of the released gas, or thermal loading.

17. The airbag module as claimed in claim 16, wherein the wall of the reservoir is opened by a reversibly unlocking flap or a corresponding valve as a result of the overpressure, the pressure or the thermal loading.

18. The airbag module as claimed in claim 1, wherein the wall of the reservoir is configured to open by a separate pyrotechnic element located in the spatial vicinity of the wall.

19. The airbag module as claimed in claim 1, wherein the wall of the reservoir is configured to open by rupturing.

20. The airbag module as claimed in claim 19, wherein the wall of the reservoir has at least one predetermined rupture point at which the wall is able to rupture.

21. The airbag module as claimed in claim 20, wherein the predetermined rupture point is configured as a score line or perforation.

22. The airbag module as claimed in claim 1, wherein the airbag module has at least one permanently opened outlet opening through which gas may be continuously released from the module.

23. The airbag module as claimed in claim 1, wherein the airbag module has at least one outlet opening that is opened to release gas from the module.

24. The airbag module as claimed in claim 23, wherein the opening of the at least one outlet opening is carried out by the movement of a closure element relative to the outlet opening.

25. The airbag module as claimed in claim 24, wherein the closure element comes into contact with the wall of the reservoir when moved.

26. The airbag module as claimed in claim 25, wherein the closure element destroys the wall upon contact with said wall.

27. The airbag module as claimed in claim 24, wherein the closure element is an adjusting disk.

28. The airbag module as claimed in claim 23, wherein the closure element creates a predetermined rupture point in the wall upon contact with the wall.

29. The airbag module as claimed in claim 1, wherein the airbag module is in flow connection with an at least partially closed space into which the gas is released from the airbag module.

30. The airbag module as claimed in claim 1, wherein a carrier is associated with the coolant reservoir is connected to the coolant reservoir and stabilizes said coolant reservoir.

31. The airbag module as claimed in claim 30, wherein the carrier is made from a plastic material.

32. The airbag module as claimed in claim 31, wherein the carrier is a carrier plate.

33. The airbag module as claimed in claim 30, wherein the coolant reservoir and the carrier are fixedly connected to the airbag module.

34. The airbag module as claimed in claim 30, wherein the carrier is arranged between the outlet opening and the coolant reservoir, wherein the outlet opening is defined by the gas generator carrier and/or of a bottom face of the airbag module.

35. The airbag module as claimed in claim 30, wherein the carrier has at least one aperture for releasing gas.

36. The airbag module as claimed in claim 35, wherein the carrier is positioned in the airbag module such that the aperture is aligned with the outlet opening of the airbag module.

37. The airbag module as claimed in claim 30, comprising an adapter plate that is fixedly connected to the airbag module.

38. The airbag module as claimed in claim 37, wherein the adapter plate is fixed to the coolant reservoir and the carrier on their outer faces.

39. The airbag module as claimed in claim 37, wherein the adapter plate arranges the airbag module on a motor vehicle.

* * * * *